United States Patent [19]

Giles et al.

[11] Patent Number: 5,384,200

[45] Date of Patent: Jan. 24, 1995

[54] THERMAL BARRIER COATING AND METHOD OF DEPOSITING THE SAME ON COMBUSTION CHAMBER COMPONENT SURFACES

[75] Inventors: David C. Giles, West Bloomfield; Roger E. Begin, Dearborn; David R. Dugger, Howell; Eric W. Paskvan, Brighton, all of Mich.

[73] Assignee: Detroit Diesel Corporation, Detroit, Mich.

[21] Appl. No.: 228,929

[22] Filed: Apr. 18, 1994

Related U.S. Application Data

[63] Continuation of Ser. No. 781,090, Dec. 24, 1991, abandoned.

[51] Int. Cl.$^6$ .............................................. B22F 7/00
[52] U.S. Cl. ................. 428/552; 428/539.5; 428/545
[58] Field of Search ............... 428/552, 539.5, 545; 501/103

[56] References Cited

U.S. PATENT DOCUMENTS

| | | | |
|---|---|---|---|
| 3,082,752 | 3/1963 | Thomas | 123/32 |
| 3,459,167 | 8/1969 | Briggs et al. | 123/191 |
| 3,649,225 | 3/1972 | Simmons, Jr. | 29/194 |
| 3,820,523 | 6/1974 | Showalter et al. | 123/191 |
| 3,873,347 | 3/1975 | Walker et al. | 117/71 M |
| 3,874,901 | 4/1975 | Rairden, III | 117/71 M |
| 3,911,890 | 10/1975 | Ansdale | 123/179 H |
| 3,911,891 | 10/1975 | Dowell | 123/191 A |
| 3,928,026 | 12/1975 | Hecht et al. | 75/134 F |
| 3,976,809 | 8/1976 | Dowell | 427/34 |
| 4,005,989 | 2/1977 | Preston | 29/194 |
| 4,074,671 | 2/1978 | Pennila | 123/191 A |
| 4,077,637 | 3/1978 | Hyde et al. | 277/235 A |
| 4,254,621 | 3/1981 | Nagumo | 60/282 |
| 4,273,824 | 6/1981 | McComas et al. | 428/256 |
| 4,300,494 | 11/1981 | Graiff et al. | 123/193 H |
| 4,330,732 | 5/1982 | Lowther | 313/130 |

(List continued on next page.)

FOREIGN PATENT DOCUMENTS 60-137870  7/1985  Japan ..................... 501/103

*Primary Examiner*—Donald P. Walsh
*Assistant Examiner*—Chrisman D. Carroll
*Attorney, Agent, or Firm*—Brooks & Kushman

[57] ABSTRACT

A thermal barrier coating and method of depositing the same on the surfaces of combustion chamber components in compression-ignition internal combustion engines is disclosed. The thermal barrier coating is a dual layer having a first metallic layer comprised of MCrAlY material deposited on the component surface. A porous ceramic layer comprised of Yttria partially stabilized zirconia or Ceria-Yttria partially stabilized zirconia is deposited on the metallic layer to impede the flow of heat therethrough. In operation, the metallic layer creates a mechanical bond between the component surface and the ceramic layer, allows for a smooth transition between the differing physical properties of the component and the ceramic layer and serves as a corrosion barrier by protecting the component from combustion gases and contaminants. There is further disclosed a method of depositing the thermal barrier coating comprising the steps of (1) chemically treating the component surface to remove dirt and oil; (2) grit blasting the treated component surface to roughen the surface and increase the available surface area for deposition; (3) plasma spray depositing a metallic layer comprised of MCrAlY material on the roughened component surface to a thickness between 0.003–0.006 inches; and (4) depositing a porous ceramic material comprised of 10%–15% volume porosity Yttria partially stabilized zirconia or 10%–15% volume porosity Ceria-Yttria partially stabilized zirconia on the metallic layer to impede the flow of heat therethrough.

5 Claims, 2 Drawing Sheets

U.S. PATENT DOCUMENTS

| | | | |
|---|---|---|---|
| 4,332,618 | 6/1982 | Ballard | 106/84 |
| 4,335,190 | 6/1982 | Bill et al. | 428/623 |
| 4,339,509 | 7/1982 | Dardi et al. | 428/632 |
| 4,471,017 | 9/1984 | Poeschel et al. | 428/215 |
| 4,485,151 | 11/1984 | Stecura | 428/633 |
| 4,495,907 | 1/1985 | Kamo | 123/193 C |
| 4,578,114 | 3/1986 | Rangaswamy et al. | 75/252 |
| 4,599,270 | 7/1986 | Rangaswamy et al. | 428/402 |
| 4,659,680 | 4/1987 | Guile | 501/104 |
| 4,706,616 | 11/1987 | Yoshimitsu | 123/41.84 |
| 4,772,511 | 9/1988 | Wood et al. | 428/325 |
| 4,810,334 | 3/1989 | Honey et al. | 204/16 |
| 4,852,542 | 8/1989 | Kamo et al. | 123/668 |
| 4,877,705 | 10/1989 | Polidor | 428/34.6 |
| 4,880,614 | 11/1989 | Strangman et al. | 428/623 |
| 4,902,358 | 2/1990 | Napier et al. | 148/127 |
| 4,909,230 | 3/1990 | Kawamura | 123/668 |
| 4,916,022 | 4/1990 | Solfest et al. | 428/623 |
| 4,966,820 | 10/1990 | Kojima et al. | 428/622 |
| 5,033,427 | 7/1991 | Kawamura et al. | 123/193 CH |
| 5,057,379 | 10/1991 | Fayeulle et al. | 428/632 |
| 5,080,977 | 1/1992 | Zaplatynsky | 428/432 |

THERMAL BARRIER COATING AND METHOD OF DEPOSITING THE SAME ON COMBUSTION CHAMBER COMPONENT SURFACES

This is a continuation of copending application Ser. No. 07/781,090 filed on Dec. 24, 1991, now abandoned.

TECHNICAL FIELD

This invention relates generally to thermal barrier coatings applied to the surfaces of metallic components in internal combustion engines. In particular, and more specifically, the invention relates to ceramic-refractory coatings and a process of applying the same to the surfaces of combustion chamber components in compression ignition internal combustion engines.

BACKGROUND ART

Heat-insulating structures and heat-insulating coatings, i.e. thermal barrier coatings have been employed by those skilled in the art to enhance the thermal efficiency of internal combustion engines by permitting more complete fuel burning at higher temperatures. Typically, such heat-insulating coatings have been applied to all of the chamber surfaces, including the cylinder wall and head and piston combustion face to prevent heat loss.

Heat-insulating structures and heat-insulating coatings have also been used in automobile exhaust systems to maintain high exhaust temperatures required by thermal reactors and catalytic converters and impede the emission of unburned hydrocarbons emitted into the atmosphere as an undesirable component of exhaust gas.

In previous attempts to increase thermal efficiency, heat-insulating structures and heat-insulating coatings such as ceramic plates and ceramic coatings, respectively, have been applied to component surfaces. Significantly, such ceramic coatings function not only as heat insulation barriers but also exhibit advantageous physical characteristics such as providing a hard, corrosive resistant, and abrasive resistant surface.

Typical of ceramic materials commercially available include a cerium-yttrium zirconium oxide material as described in U.S. Pat. No. 4,599,270, available the Perkin-Elmer Corporation.

The above ceramic materials were developed principally for application to high speed turbine blades, such as used in commercial aircraft, turbo engines. Typically, these blades are made of nickel-based superalloy, high strength steel materials and environment is one in which the blades, thus the ceramic lining on the blades, is subjected to high temperatures at relatively constant, non-cyclical, compressive loads.

Prior art literature describing the use of ceramic materials for these applications and techniques for applying the ceramic lining are shown in more detail in U.S. Pat. Nos. 4,273,824; 4,332,618; 4,335,190; 4,880,614; and 4,916,022.

The need or demand for such a heat insulating barrier in internal combustion engines, and particularly two and four cycle compression-ignition (diesel) engines, has only recently come to be realized. Recent engine designs, and the modification of pre-existing engine designs, has included increasing the power output demands for a cubic inch displacement of the engine's power capacity. Such designs have resulted in higher compression ratios and exhaust gas temperatures. Not only is it important to keep the exhaust gas temperatures from reaching the cylinder head and related components, thus reducing the cooling requirements and other engine design requirements, the heat of the exhaust gas is being used to increase the engine efficiency by recirculating it through the intake air ports.

However, experience has shown that the ceramic coatings and techniques for application to apparatus such as gas turbine engine blades, previously referenced, is not ideal for application to the surfaces of combustion chamber components in compression-ignition internal combustion engines, where (i) the substrate materials including the cylinder head and piston may be cast iron, (ii) the materials of the related components such as the exhaust valves may be aluminum alloyed high temperature steel or metallic based alloy, and (iii) the temperatures in the combustion chamber and at the combustion chamber surfaces are extremely high.

Previously known ceramic coatings and techniques for depositing the same are even less ideal for 2-cycle compression-ignition internal combustion engines such as applicant's Series 149 engine which utilizes a pot-type cast iron cylinder head. In applicants' Series 149 engine design, the temperatures in the combustion chamber are even greater than in conventional internal combustion engines, since every stroke of the piston is a combustion stroke. For example, temperatures in the combustion chamber may vary between 150° to 1400°. Similarly, temperatures at the combustion chamber surfaces cyclically range from about 150° when being freshly charged with intake air to about 1500° at combustion. All of these factors contribute to the requirement for new materials and techniques in accordance with the present invention.

Prior disclosures include those shown in U.S. Pat. Nos. 3,911,890, 3,976,809 and 3,911,891 for coating piston heads and U.S. Pat. No. 4,077,637 for coating piston rings, as well as U.S. Pat. No. 4,254,621 for ceramically coating any of the combustion chamber surfaces including the cylinder head. However, none of these is considered to serve the purposes of the present invention in providing an extremely cost effective and efficient dual layer ceramic lining and application technique for lining the combustion chamber surfaces of a compression-ignition internal combustion engine expanded to the above-mentioned operating conditions.

SUMMARY OF THE INVENTION

It is an object of the present invention to provide a protective coating for application to the surfaces of combustion chamber components exposed to cyclical temperatures and compression loads.

It is another object of the invention to provide a thermal barrier coating comprised in part of a ceramic refractory material for application to the internal surfaces of combustion chamber components, including the cylinder head, exhaust valves and piston heads. As more fully set forth herein, the thermal barrier coating is capable of providing good adherence to the materials and heat insulation properties in an environment where the temperatures cyclically range from 150° F. to 1400° F. in the compression chamber, 150° to 1500° F. at the combustion chamber surfaces and where the compressive loads on the coating may be as high as 2500 pounds per square inch.

It is a further object of the invention to provide a thermal barrier coating which is economical, and readily adaptable to being deposited on a metal substrate by means of plasma spray vapor deposition.

Yet another object of the invention is to provide a method of depositing a thermal barrier coating on the surfaces of combustion chamber components, including the cylinder heads, exhaust valves and piston heads, which is economical and reliable.

A more specific object of the present invention is to provide a dual layer thermal barrier coating for the surfaces of the combustion chamber components in a compression ignition internal combustion engine. In accordance with the present invention, the thermal barrier coating comprises a metallic layer deposited on the component surface and a ceramic layer deposited on the metallic layer to impede the flow of heat therethrough. The metallic layer creates a mechanical bond between the component surface and the ceramic layer, allows for a smooth transition between differing physical properties of the component and the ceramic layer and serves as a corrosion barrier by protecting the component from combustion gases and contaminants.

It is yet another specific object of the present invention to provide a method of depositing a dual layer thermal barrier coating on the surfaces of combustion chamber components in a compression-ignition internal combustion engine. In accordance with the present invention, the component surface should first be grit blasted to eliminate oxides and roughen the surface to increase the available surface area for deposition. A metallic layer is then deposited on the component surface to protect the component from corrosion caused by combustion gases and contaminants. Finally, a porous ceramic layer is deposited on the metallic layer to impede the flow of heat therethrough.

These and other objects and advantages of the present invention will be more obvious and apparent with reference to the drawings and detailed description of the invention which follows.

BEST MODE FOR CARRYING OUT THE INVENTION

Figure 1:
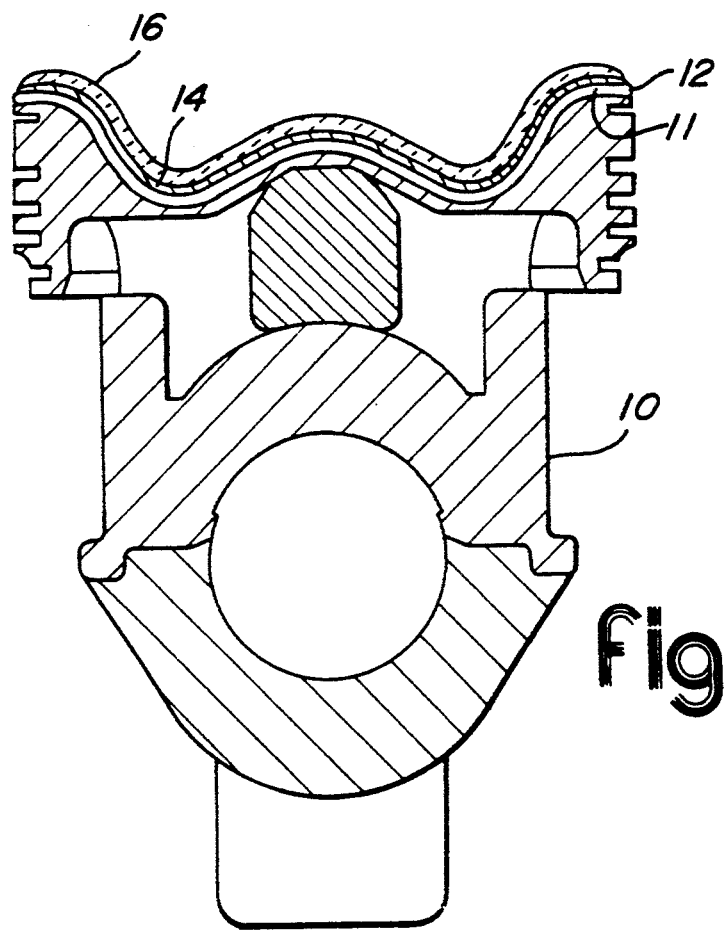
FIG. 1 is an enlarged cross-sectional view of a piston dome illustrating the metallic and ceramic layers of the thermal barrier coating of the present invention applied to the face.
Figure 2:
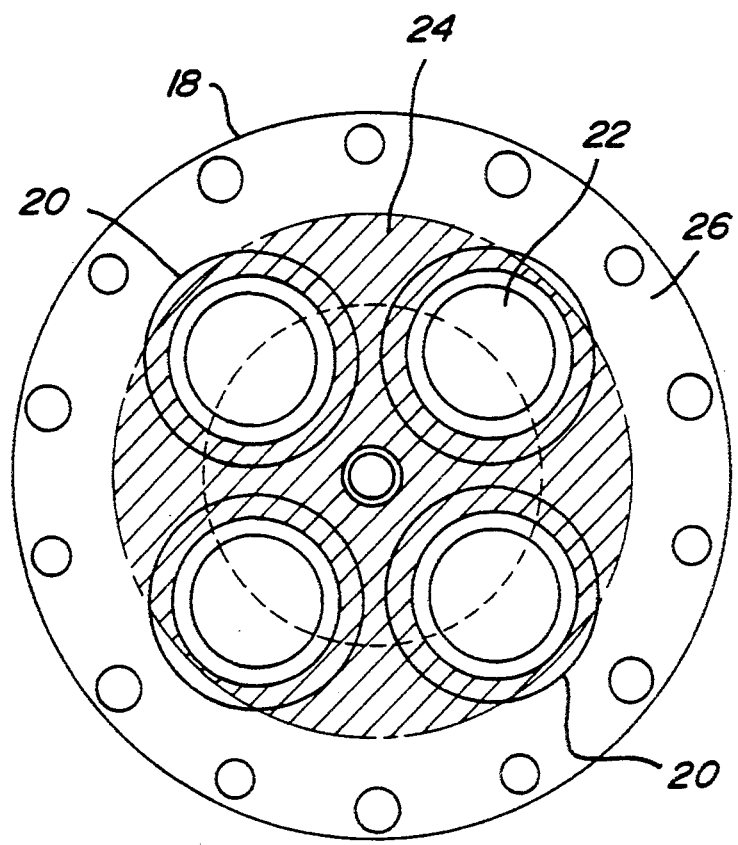
FIG. 2 is a plan view of a Series 149 pot-type cylinder head utilized in 2-cycle compression-ignition internal combustion engines manufactured by applicant and shown with the thermal barrier coating of the present invention applied thereto.

Referring to FIGS. 1 and 2, the present invention is directed to a dual-layer protective coating and a method of applying the coating to the surfaces of components which form the chambers of internal combustion engines. In FIG. 1, there is shown a piston dome generally designated by reference numeral 10 as used by applicant in its high output, Series 149 compression ignition internal combustion engines. FIG. 2 shows the protective coating of the preset invention as applied to applicant's Series 149 pot-type cylinder head. Both components shown in FIGS. 1 and 2 are constructed of cast iron for conventional specifications.

Although the use of thermal barrier coatings is known in the art, particularly the aerospace industry, previous designs and methods of application have proved inefficient and in many cases inoperable. In the case of compression-ignition internal combustion engines, and particularly 2-cycle compression-ignition engines, spallations i.e., the flaking of ceramic materials due to poor adhesion caused by thermal fatigue is recognized as the primary failure mode observed in the application of ceramic coatings to component surfaces.

In an effort to overcome the inefficiency and inoperability of known protective linings, applicant has developed a dual layer protective lining and method of applying the same to the surfaces of combustion chamber components in compression-ignition internal combustion engines as more fully described herein.

Still referring to FIG. 1, there is shown a thin metallic layer 14 deposited on the component surface 12 to protect the component from corrosion caused by combustion gases and contaminants. In the case of piston domes, as in FIG. 1, it is recognized that the component surface must initially be machined back (shown generally by reference numeral 11) to the specified coating thickness to retain the proper compression ratio. Metallic layer 14 is preferably deposited to a thickness between 0.003–0.006 inches and is comprised of a MCrAlY material selected from the group consisting of nickel base alloy (NiCrAlY), cobalt based alloy (CoCrAlY), nickel cobalt base alloy (NiCoCrAlY), and iron base alloy (FeCrAlY).

Still referring to FIG. 1, there is shown a porous ceramic layer 16 deposited on the metallic layer 14. Ceramic layer 16 is preferably deposited to a thickness between 0.010–0.015 inches and is comprised of material having between 10–15 percent volume porosity. More particularly, ceramic layer 16 may be comprised of yttrium partially stabilized zirconia or ceria-yttrium partially stabilized zirconia. In the former case, applicant has found it preferable that the ceramic layer be comprised of eight percent yttrium partially stabilized zirconia.

Metallic layer 14 referenced above in the dual layer thermal barrier coating of the present invention is recognized as creating a mechanical bond between the component surface 12 and ceramic layer 16. Metallic layer 14 also allows for a smooth transition between differing physical properties of the component, in this case piston dome 10 and ceramic layer 16. More specifically, metallic layer 14 exhibits a thermal expansion characteristic which relieves stresses that might otherwise be created at elevated operating temperatures.

As referenced above, metallic layer (bond coat) 14 is preferably comprised of a MCrAlY alloy. Such alloys have a broad composition of 17.0–23.0 percent chromium, 4.5–11.0 percent aluminum, 0.5–1.20 percent yttria, 0.0–0.20 percent iron, with M being the balance, selected from the group consisting of iron, cobalt, nickel, and mixtures thereof. Minor amounts of other alloys such as silicon may also be present. Such alloys are known in the prior art for use alone as a protective coating and are described in various U.S. patents, including U.S. Pat. Nos. 3,542,530; 3,676,085; 3,754,903; 3,928,026; 4,005,989; 4,055,705; 4,339,509; 4,743,514; 4,880,614; and 4,916,022.

Still referring to FIGS. 1 and 2, it is preferred that the MCrAlY layer be applied by plasma spray deposition. However, other deposition processes may be employed for producing the MCrAlY layer including, for example, sputtering flame spray and electron beam vapor deposition so long as a thin, uniform thickness, high integrity coating of the desired composition results.

Ceramic layer 16 which is deposited on metallic layer 14 is also subject to a broad composition of yttrium partially stabilized zirconia or cerium-yttrium partially stabilized zirconia. Applicant has found that in the former case, it is preferred to have a percentage of between 7.0-9.0 percent yttrium with trace constituents of other elements including 0.0-1.5 percent $SiO_2$, 0.0-0.5 percent CaO, 0.0-0.8 percent MgO, 0.0-0.4 percent $Fe_2O_3$, 0.0-0.2 percent $Al_2O_3$, and 0.0-0.2 percent $TiO_2$, with $ZrO_2$ being the balance. As in the case of the metallic layer 14, ceramic layer 16 is also preferably deposited by plasma spray deposition. However, other deposition processes may be employed such as sputtering, flame spray and electron beam vapor deposition.

As referenced above, it is preferable that metallic layer 14 have a thickness between 0.003-0.006 inches and the ceramic layer 16 have a thickness between 0.010 and 0.015 inches for a combined total thickness between $0.013$ and 0.021 inches. It is also preferable that ceramic layer 16 be comprised of a porous material having between 10-15 percent volume porosity. It is also preferable that particles which make-up the metallic and ceramic layers have a spherical morphology.

Referring now to FIG. 2, there is shown the protective coating of the present invention as applied to component surfaces of applicants' Series 149 pot-type cylinder head used in 2-cycle compression ignition internal combustion engines. In the pot-type design, a separate cylinder head 18 is used to encase each combustion chamber. Thus, each cylinder head 18 encases 4 exhaust valves 20.

As shown in FIG. 2, the metallic and ceramic layers, 14 and 16 are deposited only on the component surfaces such as valve heads (combustion faces) 22, and fire deck 24 which are exposed surfaces in the combustion chamber. Conventional masking techniques may be used to prevent the deposition of the metallic and ceramic coatings, 14 and 16 on non-combustion surfaces 26. Surfaces 26 are recognized as contacting the engine block and fall outside the combustion chamber.

It is anticipated that the thermal barrier coating of the present invention will be applied to the surfaces of combustion chamber components in newly manufactured engines. However, significant after market work can also be performed to repair, for example, cylinder heads and other components. Such repair work should include the deposition of the thermal barrier coating disclosed herein.

Figure 3:
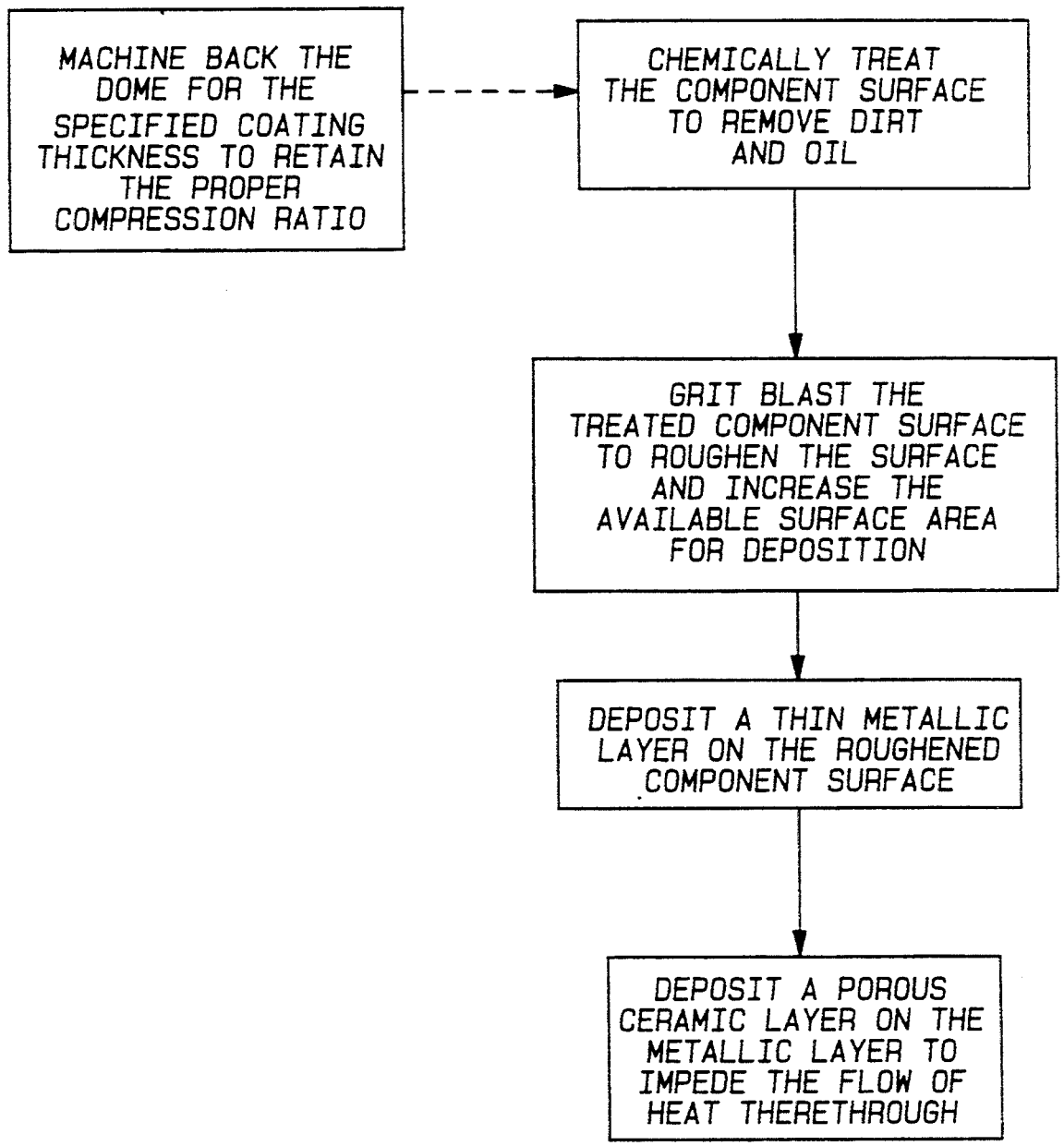
FIG. 3 is a block diagram view of the method steps of the present invention.

Referring now to FIG. 3, there is disclosed detailed method steps for depositing the thermal barrier coating of the present invention on component surfaces in compression-ignition internal combustion engines. As set forth above, it is recognized that in the case of certain components, such as piston domes, the component must initially be machined back to the specified coating in order to retain the proper compression ratio. The component surface must then be prepared by chemically treating it to remove dirt and oil. Preferably, a suitable vapor degreasing apparatus utilizing for example, perchlorethylene is utilized.

Following cleaning, the component surface grit blasted in order to roughen the surface, eliminate oxides and increase the available surface area for deposition. The component surface 12 is grit blasted using, for example, an aluminum oxide grit to achieve an optimum surface roughness between 150-300 $\mu$in AA.

Significantly, applicant has found that surface roughnesses less than the optimum range referenced above are insufficient to form a lasting mechanical bond with metallic layer 14 when exposed to cyclical temperatures and compression loads such as those exhibited by 2-cycle compression ignition internal combustion engines. Applicant has further found that surface roughnesses greater than the optimum range causes surface component peaks to actually fold over one another and break off thus reducing the available surface area and adhesion properties of the metallic layer.

Still referring to FIG. 3, a thin metallic layer 14 is then deposited on the roughened component surface. As referenced above, the metallic layer preferably comprised of MCrAlY material and is selected from the group consisting of nickel base alloy (NiCrAlY), cobalt based alloy (CoCrAlY), nickel cobalt base alloy (NiCoCrAlY), and iron base alloy (FeCrAlY)in accordance with the percentage weights of the preferred embodiment referenced above. The metallic layer deposited to a thickness between 0.003-10.006 inches at an average application rate per pass less than 0.001 inches and preferably between 0.004-0.007 inches.

The metallic layer 14 is deposited directly to the component surface 10 preferably by plasma spray vapor deposition at a spray distance between $3\frac{1}{2}$-5 inches. In this regard, applicant has found that distances greater than the desired range result in unmelted or partially melted particles deposited on the substrate. As a result, the porosity and oxide content of the metallic layer 14 is increased and the density of the metallic layer 14 is decreased. As an aside, it should be recognized that it is preferred to avoid oxidation and to decrease oxide content to obtain a better mechanical bond between the metallic layer 14 and the roughened component surface 12. Thus, components should be stored in hot, humidity-free environments between grit blasting and the application of the metallic bond coat 14 to avoid such oxidation.

Still referring to FIG. 3, a porous ceramic layer 16 is then deposited atop the metallic layer 14 to impede the flow of heat therethrough. If applied properly, the ceramic layer 16 will not exhibit any deviations such as bumps or waves across the surface contour of the component. The ceramic layer 16 will similarly be void of spalling, cracks and blisters. Applicants have found that chips on most ceramic coated parts cannot extend more than 0.20 inches away from the edge nor be proud to the edge surface. Edge chipping is not acceptable, however, on piston domes.

As referenced above, the ceramic layer is preferably comprised of material having 10-15 percent volume porosity and comprised of 7-9 percent yttrium partially stabilized zirconia or ceria yttrium partially stabilized zirconia according to the compositions of the preferred embodiments referenced above.

In the typical application, the ceramic layer 16 is deposited on the metallic layer 14 by the use of a plasma spray gun. Before the respective coatings, the ceramic and the metallic materials preferably exist as tiny spheroids. Typically, such powders are free flowing spherical alloys, manufactured by inert gas atomization. These particals are melted in the plasma gun and adhere to the component surface 12 or metallic surface 14, respectively. Because the plasma spray interacts with air molecules, the metallic and ceramic coatings 14 and 16 are porous. The degree of porosity, however, can be adjusted by varying the stand off torch distance, i.e., plasma spray distance.

The ceramic layer is preferably deposited to a thickness between 0.010–0.015 inches at an average application rate per pass less than 0.001 inches and more preferably in the range of 0.004–0.007 inches at a spray distance between 3½–5 inches. For verification purposes, the proper thickness of both the ceramic layer 16 and the metallic layer 14 can be confirmed using a permascope or a tinsley gauge. Similarly, compositional requirements may be confirmed by using a scanning electron microscope.

In contrast to the results of varying the spray distance during the deposition of the metallic layer, applicant has found that spray distances closer than the optimum range result in increased density and decreased porosity which, in turn, inhibits adhesion of the ceramic layer 16 to the metallic layer 14.

Similarly, the utilization of spray distances greater than the optimum range result in increased porosity and decreased structural integrity of the coating. Under such conditions, the thermal barrier coating has been found to fall during thermal cycling resulting in spallations.

It is recognized that the metallic and ceramic layers may be applied by other deposition means, including electron beam vapor deposition, sputtering, chemical vapor deposition, powder flame spray application and detonation gun application. Typical methods of plasma-spray coatings are more thoroughly set forth in the publication "Plasma-Spray Coatings", SCIENTIFIC AMERICAN, September 1988, Herbert Herman, the teachings of which are expressly incorporated herein.

While the best modes for carrying out the invention have been described in detail, those familiar with the art to which this invention relates will recognize various alternative designs and embodiments for practicing the invention as defined by the following claims.

What is claimed is:

1. In a compression ignition internal combustion engine, a thermal barrier coating for the surfaces of the combustion chamber components, comprising:

a metallic layer having a thickness between 0.003–0.006 inches deposited on the component surface;

a ceramic layer having a thickness between 0.010–0.015 inches and a volume porosity of 10–15% deposited on the metallic layer to impede the flow of heat therethrough, wherein the metallic layer creates a mechanical bond between the component surface and the ceramic layer, allows for a smooth transition between the differing physical properties of the component and the ceramic layer and serves as a corrosion barrier by protecting the component from combustion gases and contaminants;

the metallic layer comprising a MCrAlY material selected from the group consisting of nickel base alloy, cobalt base alloy, nickel cobalt base alloy and iron base alloy;

the ceramic layer is comprised of eight percent Yttria partially stabilized zirconia comprised essentially of the following materials by percentage weight:

7.0–9.0 wt % $Y_2O_3$
   0.0–1.5 wt % $SiO_2$
   0.0–0.5 wt % $CaO$
   0.0–0.8 wt % $MgO$
   0.0–0.4 wt % $Fe_2O_3$
   0.0–0.2 wt % $Al_2O_3$
   0.0–0.2 wt % $TiO_2$
   Balance $ZrO_2$ the metallic layer being comprised of particles having a spherical morphology, the ceramic layer being comprised of particles having a spherical morphology.

2. A thermal barrier coating as in claim 1, wherein the metallic layer is comprised essentially of the following materials by percentage weight:

17.0–23.0 wt % Chromium
   4.5–11.0 wt % Aluminum
   0.5–1.20 wt % Y
   0.0–0.20 wt % Iron
   Balance Nickel.

3. The invention of claim 2 wherein the metallic and ceramic layers are deposited as a series of successive layers and each said successive layer being applied at a thickness of less than 0.001 inches.

4. The invention of claim 3 wherein each of said successive layers has a thickness of 0.0004 to 0.0007 inches.

5. The invention of claim 4 wherein the component surface to which the metallic layer is deposited has a surface roughness of 150–300μ in AA.

* * * * *